Figure 1:
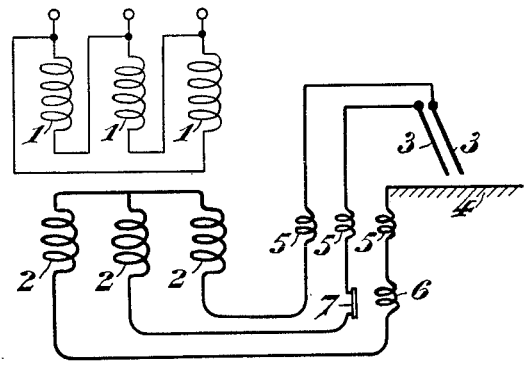

Dec. 14, 1926.

J. BETHENOD 1,610,920

ELECTRIC ARC WELDING OR CUTTING PROCESS

Filed Jan. 5, 1926

Inventor.
Joseph Bethenod.
per
Attorney.

Patented Dec. 14, 1926.

1,610,920

UNITED STATES PATENT OFFICE.

JOSEPH BETHENOD, OF PARIS, FRANCE, ASSIGNOR TO SOCIETE ALSACIENNE DE CONSTRUCTIONS MECANIQUES, OF MULHOUSE, FRANCE.

ELECTRIC-ARC WELDING OR CUTTING PROCESS.

Application filed January 5, 1926, Serial No. 79,339, and in France January 8, 1925.

It has been proposed for a long time to use single phase alternating current for arc welding or cutting, a suitable impedance being inserted, as is well known, into the circuit namely for the purpose of giving the arc the necessary stability or steadiness, whilst limiting the current at the striking of the arc (which is usually done by means of an instantaneous short-circuit). The use of large welding sets thus equipped, is frequently inadmissible on polyphase current circuits which however are those mostly in use. In fact, the single phase character of the load is liable to alter the balance of the phases and thus to produce a serious disturbance in the distribution. Moreover, single phase arc is as a rule difficult to strike, and to sustain, and unless special devices are used, the power factor of the installation generally remains very low.

One of the objects of the present invention is to provide a new electric arc welding process in which the energy supplied by a polyphase circuit is utilized directly, the load being equally distributed among all the phases. In principle this process consists in employing a plurality of independent arcs produced by means of a polyphase source between the parts to be welded together (or to be cut) and electrodes arranged next to, but insulated from, each other.

These arcs are obtained by applying to the electrodes tensions with phases displaced relatively to each other, the parts to be welded being themselves connected to one of the poles of the polyphase source by a conductor traversed by a current at least equal to that which feeds each electrode. This latter condition which constitutes an essential characteristic of the invention, is of the greatest importance as regards the penetration of the welding. Moreover, owing to the displacement of phase in the tensions applied at the electrodes, the multiple arcs thus produced, never go out simultaneously, and the result is a very intensive permanent ionization of the point or place where the welding takes place, which considerably facilitates the periodic restriking of each arc; consequently, the stability of working is at least comparable to that obtained with a direct current supply. Moreover, the power factor becomes considerably greater than that obtained with a single phase welding set of the usual type, as, on the one hand, the no load voltage or striking voltage can be got less high, relatively to the load voltage, and, on the other hand, the current taken from the feeding circuit, can be freed from certain important harmonics produced by the arc, this result being obtained, as is well known, by a suitable coupling or connection of the windings of the transformer feeding the arc in question.

Figure 2:
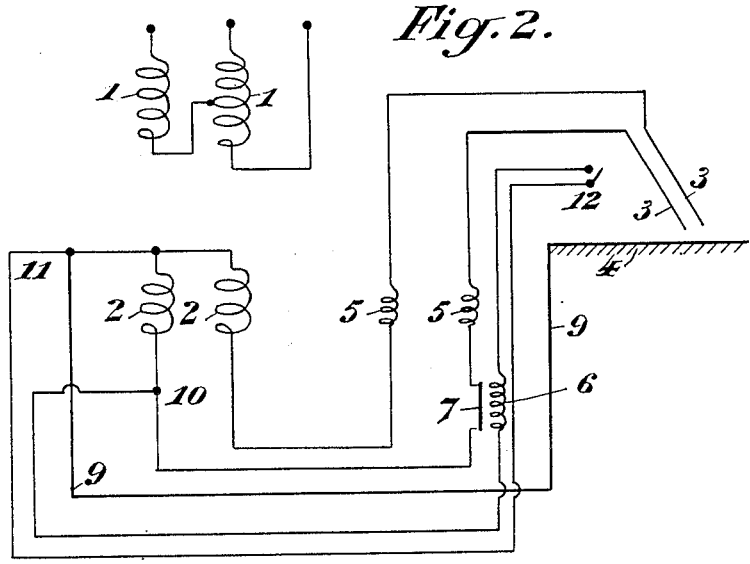

The figures annexed herewith represent the wiring diagrams of two examples of arc welding or cutting plants established according to the present invention. Figure 1 refers to one three-phase arc plant supplied by a three-phase current system; Figure 2 refers to a two-phase arc plant supplied by a three-phase current system.

Figure 1 shows specially, by way of example, a welding plant according to the invention. At 1 are shown the primary windings of the transformer feeding the arc; in order to give a concrete example, it has been assumed that the circuit is a three phase one, and that the primary windings 1 are connected in triangle. The secondary windings 2 which are for instance in star connection, are connected to two electrodes 3 and to the mass 4 on which rest the parts to be welded. In that way a three phase arc is produced between these parts and the two electrodes. Reactance coils 5 which are used eventually to limit the current at the striking ensure to the said arc the necessary steadiness of working. These coils could be provided with independent magnetic circuits adjustable individually if required, but they could also be arranged together on a magnetic circuit with three legs. It goes without saying that they could also be relegated into the primary circuits, or even be completely done away with, in the event of the transformer possessing sufficient magnetic dispersion or leakage.

In order to avoid the persistence of a monophase arc between the two electrodes 3 when they are moved away from the parts to be welded, on the conductor connected to the mass 4 could be inserted at 6 the magnetizing winding of a contactor which thus cuts off automatically at 7 the supply to one of the electrodes, as soon as the arc leaves the parts to be welded.

In Figure 1 it has been assumed that the primary windings 1 are delta connected, this connection, as is well known, produces the suppression of any harmonic which is a multiple of three, in the current taken from the circuit. This result is of special advantage in the present case, as the welding arc generally constitutes a source of considerable harmonics of that order. Nevertheless, the star connection of the primary windings 1 may be sometimes preferred. As regards the star connection of the secondary windings 2, it makes it possible to distribute the load in a satisfactory manner between the three phases of the circuit, even if the dissymmetry due to the use of welding plates for forming one of the poles of the arc, were very pronounced; it is sufficient for the purpose to adopt for that of the windings 2 which is connected to the mass 4, a number of turns different from the number of the two other windings (generally a greater number). But the windings 2 could be eventually connected in delta.

As regards the electrodes 3, they could be constituted by conductor rods of metal or carbon, arranged parallel to each other and separated from each other by an adhesive insulating material of suitable nature, like in the old Jablochkoff candles. In that way, these rods could be easily held by a bipolar electrode holder arranged for the purpose. The insulating material in question could constitute at the same time for instance, a reducing coating or flux, in order to facilitate the operation, in such a case it could cover if required the whole surface of the electrodes which could be besides arranged on the contrary concentrically, the outer electrode being constituted by a tube obtained in any desired manner, for instance by bending cylindrically a metal plate etc. It goes without saying that in any case the insulation between the electrodes could be ensured by covering them with a material separate from the flux proper when the latter has too pronounced a conductivity.

It is obvious that numerous modifications could be made without departing from the spirit of the invention. More particularly, the number $n$ of phases could be greater than three, provided that $n-1$ rods are used.

Finally, in the case of a two phase circuit, the windings of the transformer could be arranged in such a manner that the welding arc should be still fed by a three phase current, this would be obtained as is well known, by means of a Scott or any other equivalent connection.

Nevertheless, direct application of two phase current to welding (or cutting etc.) by arc, gives excellent results in practice, by means of two electrodes, on condition that each electrode is connected respectively to one of the poles of one of the two phases of the source, the two other poles being connected together to the mass on which rest the parts to be welded; in that way, is obtained a two phase system with three wires (or with common return). In these conditions, experience shows that the arc thus produced could be considered as being practically the juxtaposition of two single phase arcs springing up respectively between each of the electrodes and the parts to be welded together, the corresponding currents being displaced to $\frac{\pi}{2}$ as regards phase. In other words, the single phase arc which has the tendency to spring between the two electrodes when they are moved away from the parts to be welded, retains only a very low intensity (or even zero) as soon as the two principal arcs which have been just defined, come into action. Owing to this circumstance, the phases of the circuit are equally loaded or balanced; besides, the stability or steadiness of working is remarkable, for when one of the principal arcs passes through an extinction, the current passing through the other principal arc, is just the maximum, the periodic restriking of each arc is thus greatly facilitated, owing to the intense ionization of the point. Finally, the distribution of heat among the electrodes and the parts to be welded, is exceedingly satisfactory as proved by experience.

Figure 2 of the accompanying drawing shows, by way of example, a connection of a two phase arc according to the invention. It has been assumed, by way of example, that the source was a three phase one and that the primary windings 1, 1 of two single phase transformers, were connected by the well known Scott connection. Two-phase currents are induced in the secondary windings 2, 2 and feed the electrodes 3, 3; as already stated, these secondary windings have a common pole connected by a conductor 9 to the mass 4 supporting the parts to be welded. Inductances 5, 5 adjustable if required, are used for limiting the currents at the striking, and contribute to the steadiness of working. It is obvious that these inductances could be done away with if the transformers had considerable magnetic leakage. Moreover, it goes without saying that the transformation of the three phase current into two phase current could be effected by a single transformer with a three legged magnetic circuit, in accordance with the connection originally indicated by M. Leblanc, etc. It must be pointed out besides that even when the direct single phase arc between the electrodes reaches an appreciable intensity, the balancing of the phases of the supply circuit can be obtained by adopting different values for the inductances 5.

In order to avoid the persistence of a single phase arc between the two electrodes when they are moved away from the parts to be welded, could be further advantageously used the addition of a contactor by means of which the supply to one of the two electrodes could be cut off as soon as the arc leaves the parts to be welded.

In Figure 2 is shown by way of example a method of feeding the magnetizing winding 6 of the contactor 7 in question; it consists in supplying the said winding by means of a shunt circuit for instance connected across the points 10 and 11, this circuit comprises also in series a switch 12 mounted in the electrode holder and easily manipulated by hand by the operator.

The opening of the contactor 7 could be obtained either by opening or by closing the switch 12.

In the former case, the operator holds this switch closed during the work, and opens it when he stops welding by moving the electrodes 3 away from the parts to be welded; this opening brings about the opening of the contactor 7.

In the second case, the operator keeps open the switch 12 during working, and closes it only when he moves the electrodes 3 away from the parts to be welded. There is no objection to his allowing this switch 12 to open a few seconds afterwards, for at that moment the rods will have become sufficiently cold to prevent any arc from striking between them, in spite of the opening of the switch 12 having produced the closing of the contactor 7.

Having now particularly described and ascertained the nature of my said invention and in what manner the same is to be performed, I declare that what I claim is:—

1. A method of electric welding or cutting by means of a plurality of independent polyphase arcs produced between the parts to be welded or cut and electrodes juxtaposed but insulated from each other, the parts to be welded or cut being themselves connected to one of the poles of the polyphase source by a conductor traversed by a current at least equal to that which feeds each electrode.

2. A method of electric welding or cutting by means of three independent three-phase arcs produced between the parts to be welded or cut, and two electrodes juxtaposed but insulated from each other, the parts to be welded or cut being connected to the third pole of the source of three phase current.

3. A method of electric welding or cutting by means of two independent two phase arcs produced between the parts to be welded and two electrodes juxtaposed but insulated from each other, the parts to be welded or cut being themselves connected to the common conductor of a source of two phase current with three wires.

4. An apparatus for electric arc welding or cutting, comprising in combination, a source of three phase current, two electrodes juxtaposed and insulated from each other, the said electrodes being connected respectively to two of the poles of the three phase source, the third pole of which is connected to the parts to be welded or cut and means for opening the circuit of an electrode when the current in the wire connected to the parts to be welded or cut, ceases.

5. An apparatus for electric arc welding or cutting, comprising in combination, a source of three phase current, two electrodes juxtaposed and insulated from each other, the said electrodes being connected respectively to two of the poles of the three phase source, the third pole of which is connected to the parts to be welded or cut, and an automatic switch which is controlled by the current circulating between the source and the parts to be welded or cut, and opens the circuit of an electrode when the said current ceases.

6. An apparatus for electric arc welding or cutting, comprising in combination, a source of two phase current with three wires, the common wire or conductor of which is connected to the parts to be welded or cut, two electrodes juxtaposed and insulated from each other, the said electrodes being connected respectively to the two other poles of the source, and means for opening the circuit of an electrode when the current in the conductor connected to the parts to be welded or cut ceases.

7. An apparatus for electric arc welding or cutting, comprising in combination, a source of two phase current with three wires, the common conductor of which is connected to the parts to be welded or cut, two electrodes juxtaposed and insulated from each other, the said electrodes being connected respectively to the two other poles of the source, and an automatic switch which is controlled by the current flowing between the source and the parts to be welded or cut, and opens the circuit of an electrode when the said current ceases.

In witness whereof I affix my signature.

JOSEPH BETHENOD.